(12) United States Patent
Ruggeri

(10) Patent No.: US 12,454,416 B2
(45) Date of Patent: Oct. 28, 2025

(54) MOTOR CARTRIDGE FOR ROLLER, ROLLER

(71) Applicant: RULLI RULMECA S.P.A., Alme' (IT)

(72) Inventor: Giovanni Ruggeri, Alme' (IT)

(73) Assignee: RULLI RULMECA S.P.A., Alme' (IT)

( * ) Notice: Subject to any disclaimer, the term of this patent is extended or adjusted under 35 U.S.C. 154(b) by 49 days.

(21) Appl. No.: 18/278,070

(22) PCT Filed: Feb. 18, 2022

(86) PCT No.: PCT/IB2022/051463
§ 371 (c)(1),
(2) Date: Aug. 21, 2023

(87) PCT Pub. No.: WO2022/180493
PCT Pub. Date: Sep. 1, 2022

(65) Prior Publication Data
US 2024/0051758 A1    Feb. 15, 2024

(30) Foreign Application Priority Data
Feb. 24, 2021   (IT) .................. 102021000004304

(51) Int. Cl.
*B65G 13/06*     (2006.01)
(52) U.S. Cl.
CPC ................... *B65G 13/06* (2013.01)
(58) Field of Classification Search
CPC ..... B65G 13/06; B65G 13/071; B65G 13/073
See application file for complete search history.

(56) References Cited

U.S. PATENT DOCUMENTS

| 5,413,209 A | * | 5/1995 | Werner | ................ | B65G 23/08 |
| | | | | | 384/465 |
| 6,206,181 B1 | * | 3/2001 | Syverson | ............. | H02K 7/1016 |
| | | | | | 198/784 |

(Continued)

FOREIGN PATENT DOCUMENTS

| DE | 102006049327 A1 | 4/2008 |
| DE | 102016112051 A1 | 1/2018 |

(Continued)

OTHER PUBLICATIONS

European Patent Office, International Search Report issued in PCT/IB2022/051463, mailed May 25, 2022, Rijswijk, NL.

(Continued)

*Primary Examiner* — Mark A Deuble
(74) *Attorney, Agent, or Firm* — Ferguson Case Orr Paterson

(57) ABSTRACT

A roller is provided which has a roller body extending between a first roller end and a second roller end, the roller body defining a motor cartridge seat therein, and a motor cartridge having an elongated cartridge body extending along an axial direction between a first cartridge body end and a second cartridge body end, and a motor unit supported at the first cartridge body end. The motor cartridge is connected to the roller exclusively by the first cartridge body end leaving the cartridge body projecting in a cantilever manner. The motor unit transmits a rotation torque to the roller by shape coupling exclusively through the first cartridge body end.

19 Claims, 12 Drawing Sheets

(56) References Cited

U.S. PATENT DOCUMENTS

| | | | | |
|---|---|---|---|---|
| 6,766,900 B2* | 7/2004 | Kanaris | ............... | F16D 41/10 |
| | | | | 198/788 |
| 6,837,364 B2* | 1/2005 | Kanaris | ............... | B65G 23/08 |
| | | | | 198/782 |
| 7,299,915 B2* | 11/2007 | El-Ibiary | ............... | B65G 23/08 |
| | | | | 198/791 |
| 8,789,686 B2* | 7/2014 | Lindemann | ............... | B65G 13/06 |
| | | | | 198/788 |
| 9,359,142 B2* | 6/2016 | Jepsen | ............... | B65G 23/08 |
| 9,493,310 B2* | 11/2016 | Dudek | ............... | B65G 39/02 |
| 9,994,398 B1* | 6/2018 | Hansson | ............... | B65G 39/09 |
| 10,093,487 B2* | 10/2018 | Ramezani | ............... | H02K 1/02 |
| 11,091,321 B2* | 8/2021 | Dorok | ............... | B65G 39/02 |
| 2005/0121296 A1* | 6/2005 | Haan | ............... | B65G 13/075 |
| | | | | 198/780 |
| 2009/0194389 A1* | 8/2009 | Kanaris | ............... | B65G 23/08 |
| | | | | 198/788 |

FOREIGN PATENT DOCUMENTS

| | | |
|---|---|---|
| EP | 1656312 B1 | 12/2006 |
| WO | 2013000006 A2 | 1/2013 |
| WO | 2016141396 A1 | 9/2016 |

OTHER PUBLICATIONS

European Patent Office, International issued in PCT/IB2022/051463, mailed May 25, 2022.

European Patent Office, International Preliminary Report issued in PCT/IB2022/051463, mailed Feb. 14, 2023.

* cited by examiner

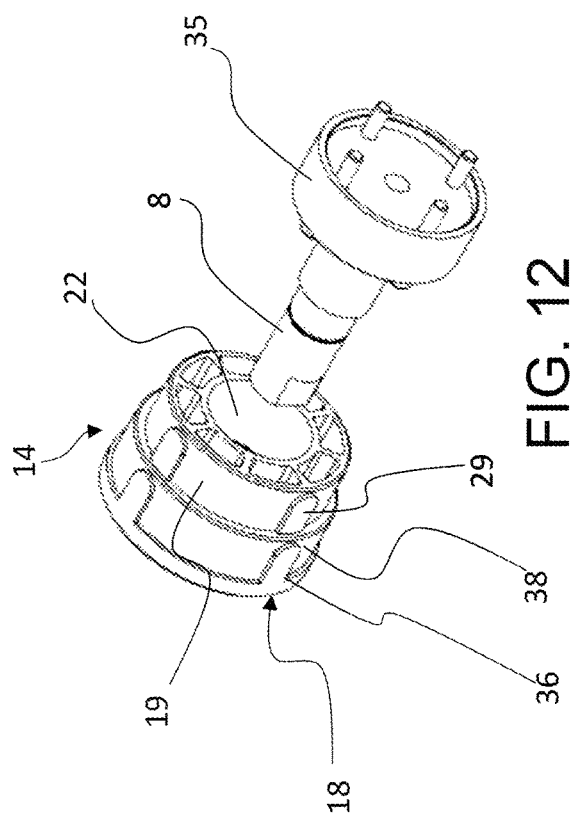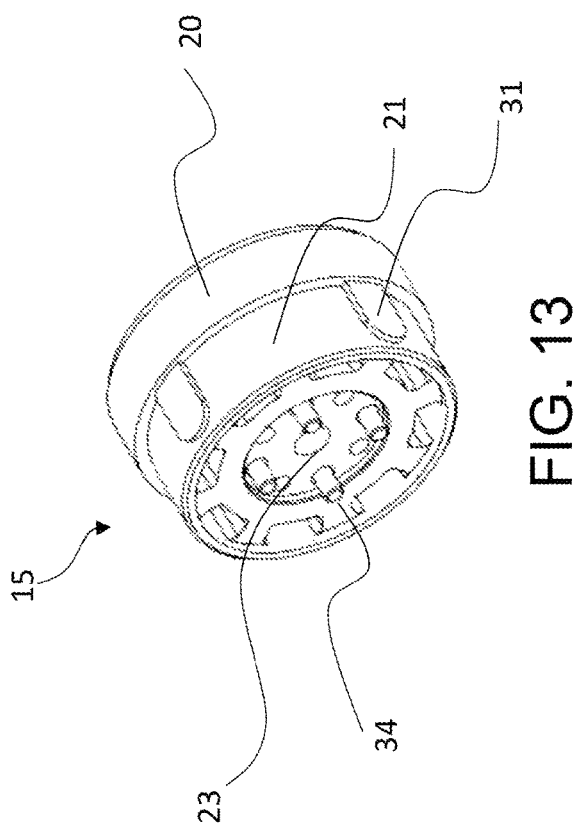

MOTOR CARTRIDGE FOR ROLLER, ROLLER

CROSS-REFERENCE TO RELATED APPLICATIONS

This application is a National Phase Application of PCT International Application No. PCT/IB2022/051463, having an International Filing Date of Feb. 18, 2022 which claims the benefit of priority to Italian Patent Application No. 102021000004304, filed Feb. 24, 2021, each of which is hereby incorporated by reference in its entirety.

FIELD OF THE INVENTION

The present invention relates to a roller comprising a motor cartridge.

BACKGROUND ART

Roller conveyors are known among the systems for moving loads and goods.

Roller conveyors usually comprise a support frame onto which there are connected at least one motorized roller or motoroller, a plurality of idle rollers and/or a plurality of driven rollers, and a motion transmission system, e.g., at least one transmission belt or chain, which allows transferring the motion from said at least one motorized roller, directly or indirectly, to the plurality of driven rollers by means of said at least one belt or chain.

In particular, the motorized roller or motoroller comprises a hollow cylinder, in which a motor is arranged, which allows rotating the hollow cylinder with respect to the frame.

In some known solutions, the motor is arranged inside the hollow cylinder so as to transmit the drive torque to the roller by friction coupling. Some solutions of this type are known from EP1656312B1, DE102006049327A1, DE 10 2016 112051, WO 2013/000006 and WO 201 6/1 41 396.

Such solutions envisage the use of gaskets or contacts that work by friction in order to transmit the motion or rotation torque from the motor to the inner diameter of the roller or motoroller cylinder. Such gaskets comprise or consist of elastomers, therefore as they work by friction they can lose effectiveness, undermining the transmission of the motion from the motor to the roller or motoroller cylinder, i.e. reducing, if not cancelling out, the effectiveness of the transmission of motion from the motoroller to the driven rollers. Additionally, the loss of effectiveness of the gaskets over time, reduces the control of the material conveyed by the roller conveyor, with potential danger to the integrity of the conveyed materials and the people located in the vicinity of the roller conveyor. Hence, to overcome the loss of effectiveness of such gaskets, it is necessary to replace the motor, even if it is still operational, from the roller cylinder in order to be able to restore the correct transmission of movement from the motor to the roller cylinder. Such operations are very time consuming in terms of machine downtime, with consequent economic losses.

Therefore, a very strongly felt need in the sector is to reduce as much as possible the times and costs deriving from machine downtime, providing an effective and innovative system for transmitting motion from the motor to the roller cylinder with respect to the prior art.

In particular, the need is strongly felt to devise technical solutions that enable a significant reduction in events in which it is necessary to extract the motor from the roller, doing everything possible to limit operations on the motor to routine maintenance and any motor breakdowns.

Additionally, there is a strongly felt need to produce motor cartridges adapted to be inserted into a roller that maintain high operating reliability.

Therefore, the problem underlying the present invention is to devise a roller, which has such structural and functional features as to satisfy the aforementioned requirements and, at the same time, solve the drawbacks mentioned with reference to the prior art and satisfy the aforesaid needs felt.

SUMMARY OF THE INVENTION

The present invention sets out to provide a motor cartridge for a roller, and a roller which have such structural and functional features as to satisfy the aforementioned requirements and, at the same time, solve the drawbacks mentioned with reference to the prior art and satisfy the aforesaid needs felt.

This and other objects and advantages are achieved with a motor cartridge and a roller according to the present disclosure.

Some advantageous embodiments are also described.

From the analysis of this situation it has emerged how the proposed solution enables a motor cartridge to be produced constituting a single component for the end customer with respect to the prior art, enabling a reduction in the probability of the motor cartridge breaking down and therefore a reduction in machine downtime.

Additionally, the proposed solution enables self-supporting motor cartridges to be produced at just one end of the cartridge body.

According to some solutions, the motor cartridge envisages a single bearing which internally supports the stator of the motor unit and externally supports the rotor or gear motor of the motor unit, through which the drive torque can be transferred to the roller and at the same time support the roller, the motor unit and the cartridge body.

Additionally, the proposed solutions enable the reliability and versatility of motorized rollers provided with a motor cartridge to be increased and machine downtime to be significantly reduced.

FIGURES

Further features and advantages of the motor cartridge and roller will become apparent from the description provided below of preferred exemplary embodiment thereof, given by way of non-limiting example, with reference to the accompanying drawings, in which:

FIG. 11 shows an axonometric exploded view of the head, the stator stationary shaft and the stator base of the motor cartridge of FIG. 1;

FIG. 13 shows a side view of the sleeve of the motor cartridge of FIG. 1.

DESCRIPTION OF SOME PREFERRED EMBODIMENTS

Figure 1:
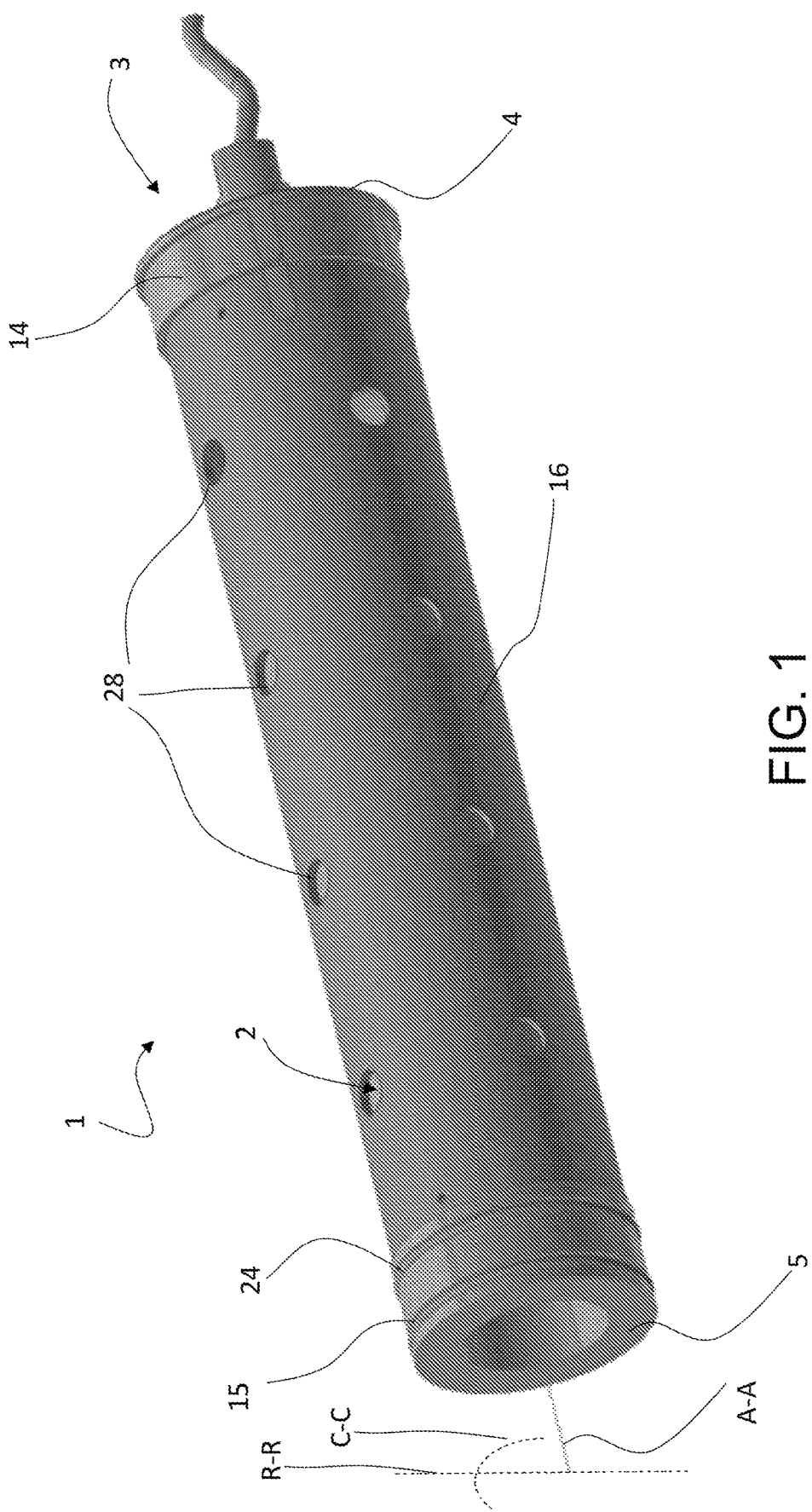
FIG. 1 shows an axonometric view of a motor cartridge according to the present invention.
Figure 2:
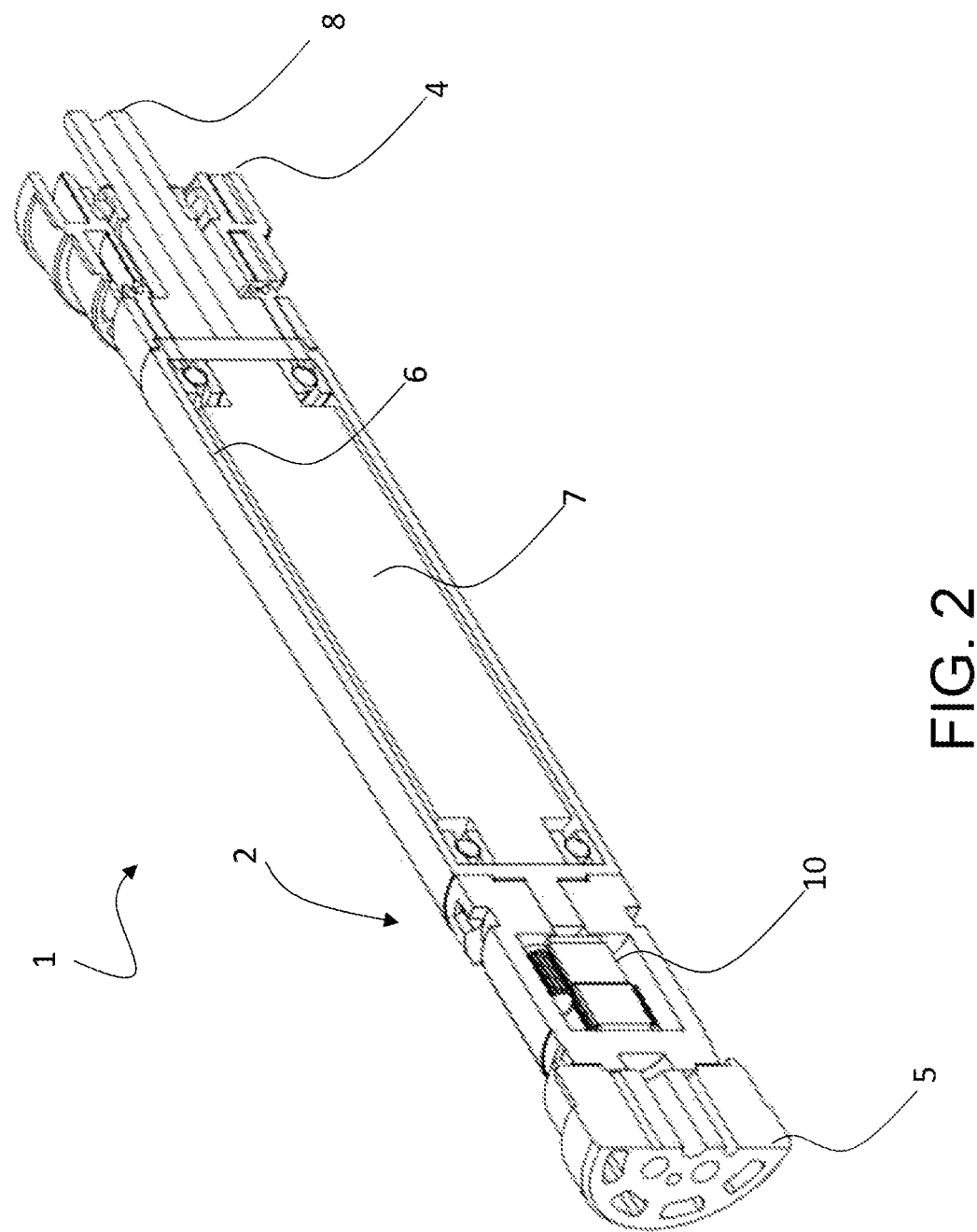
FIG. 2 shows an axonometric view partially sectioned along a center line of the motor cartridge of FIG. 1, where some parts have been removed.
Figure 3:
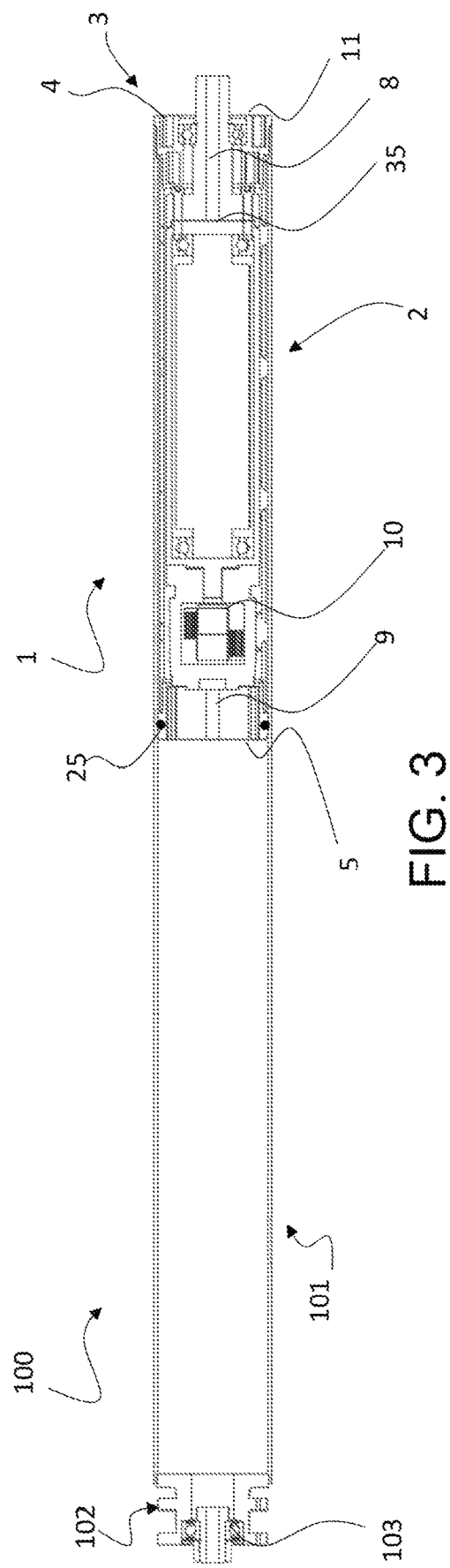
FIG. 3 shows a side view partially sectioned along a center line of a roller according to the present invention comprising the motor cartridge of FIG. 1.
Figure 4:
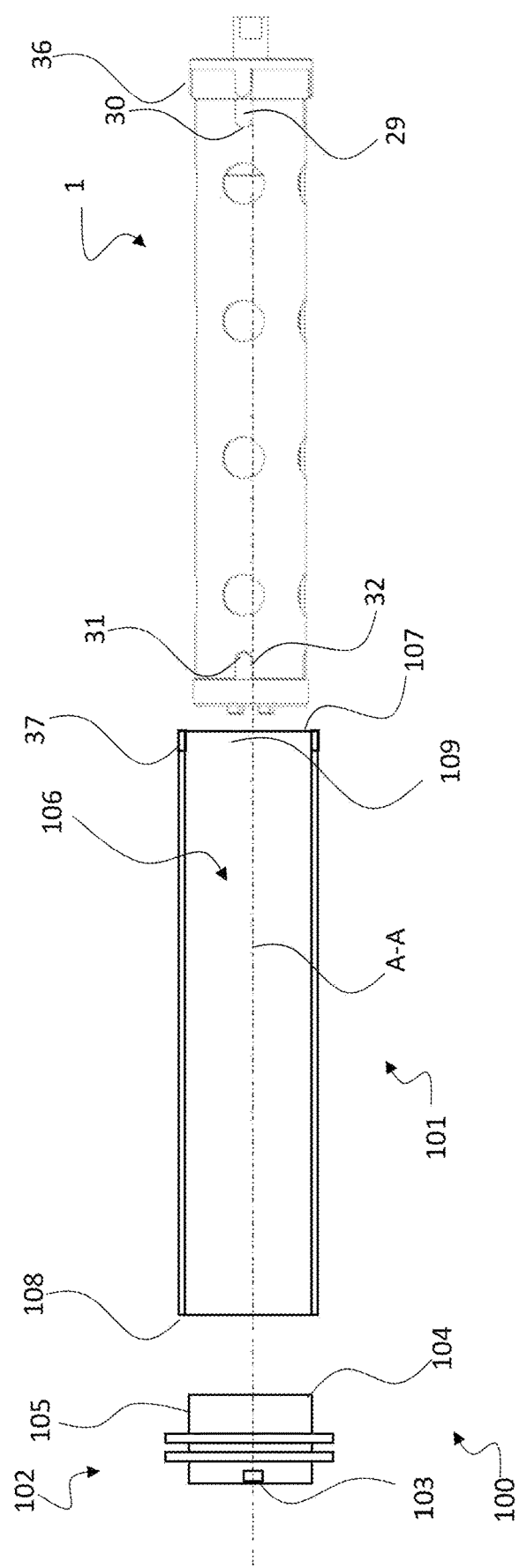
FIG. 4 shows a partially sectioned side view of the roller of FIG. 3 exploded along a center line of the motor cartridge illustrated in FIG. 1.
Figure 5:
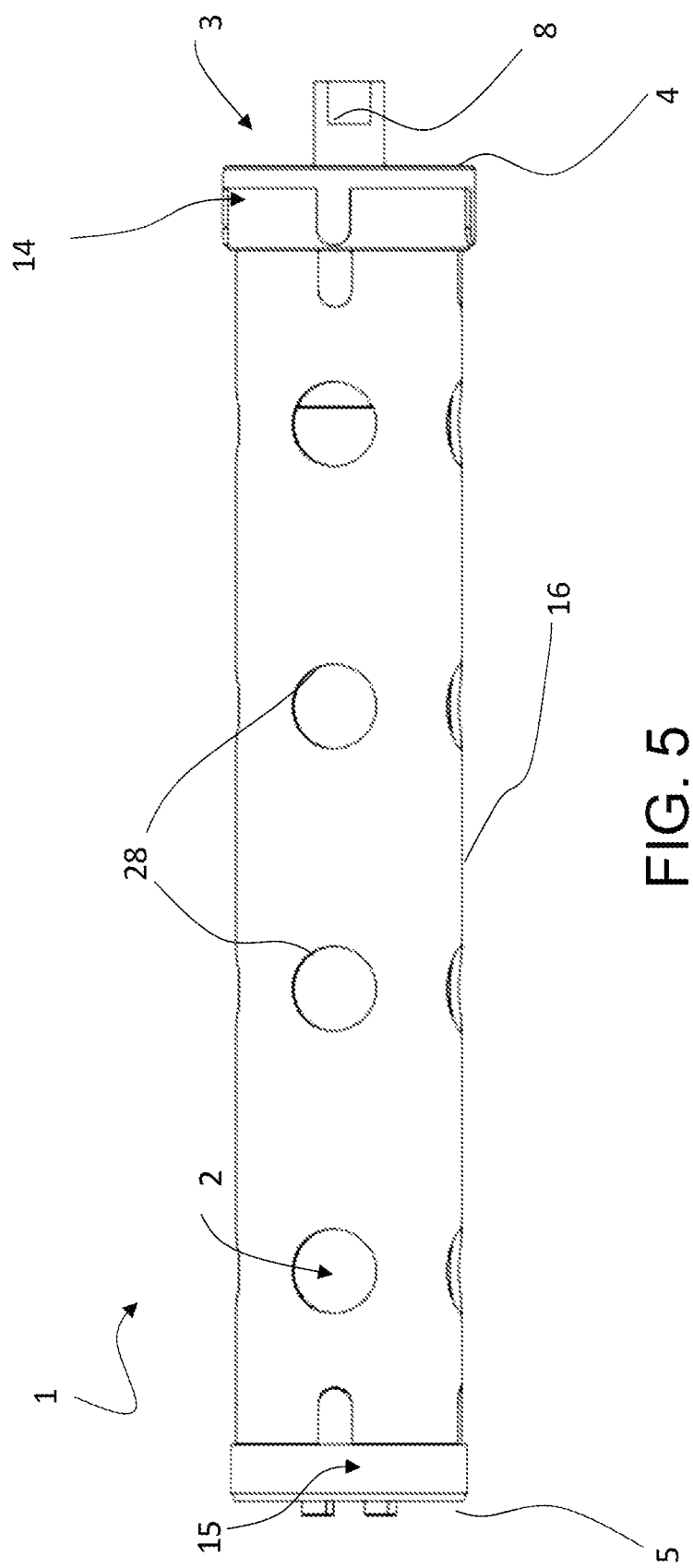
FIG. 5 shows a side view of the motor cartridge of FIG. 1.
Figure 6:
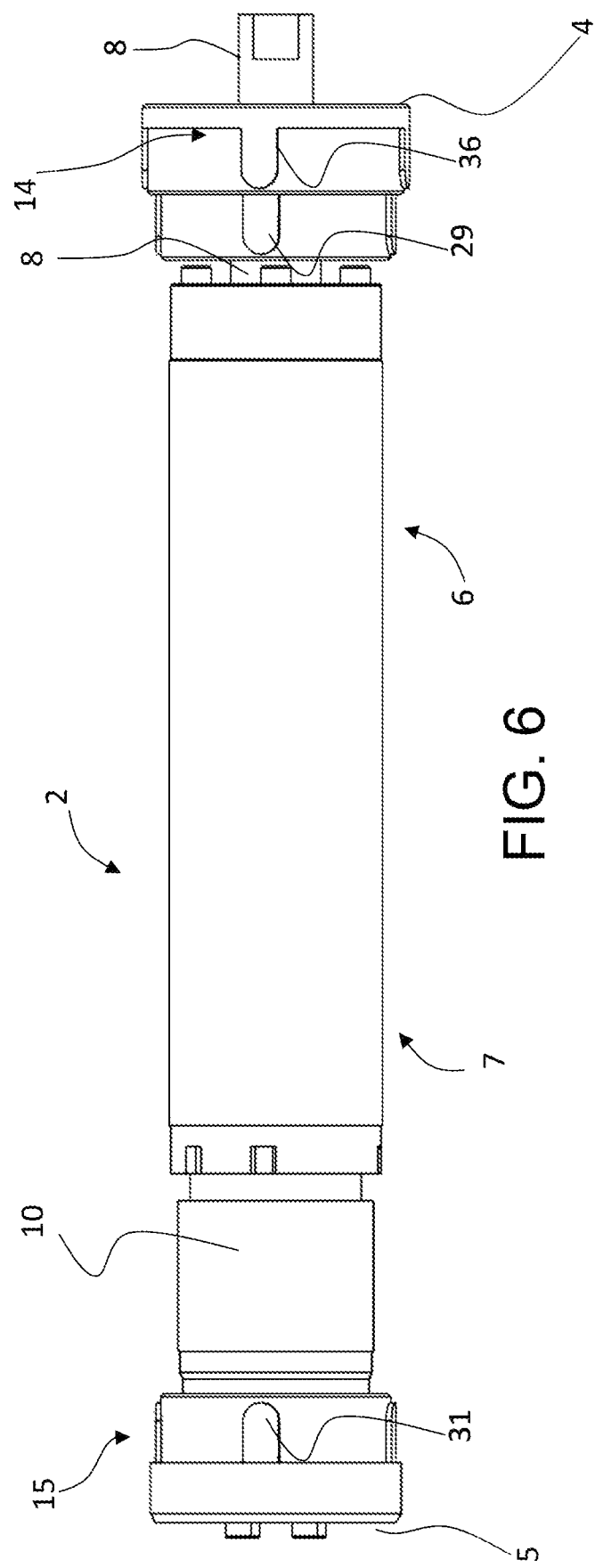
FIG. 6 shows a side view of the motor cartridge of FIG. 5 without a transmission tube.
Figure 7:
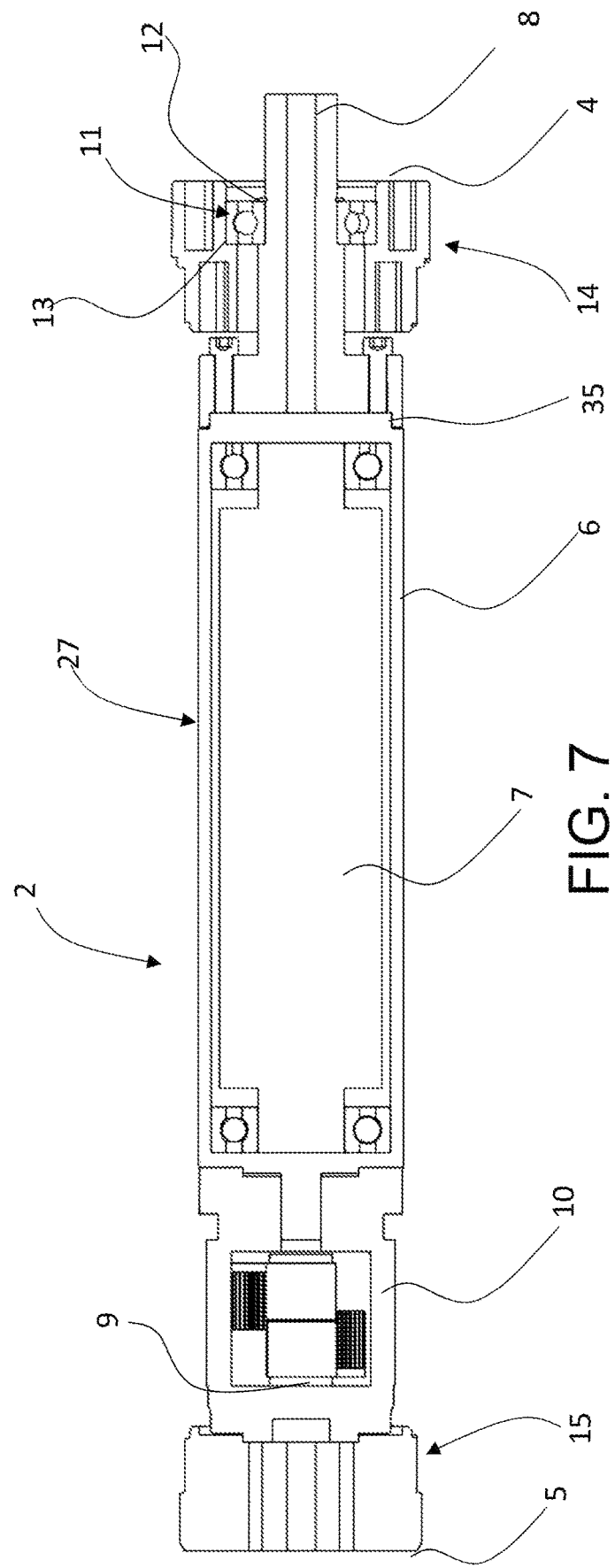
FIG. 7 shows a partially sectioned view along a center line of the motor cartridge illustrated in FIG. 6.
Figure 8:
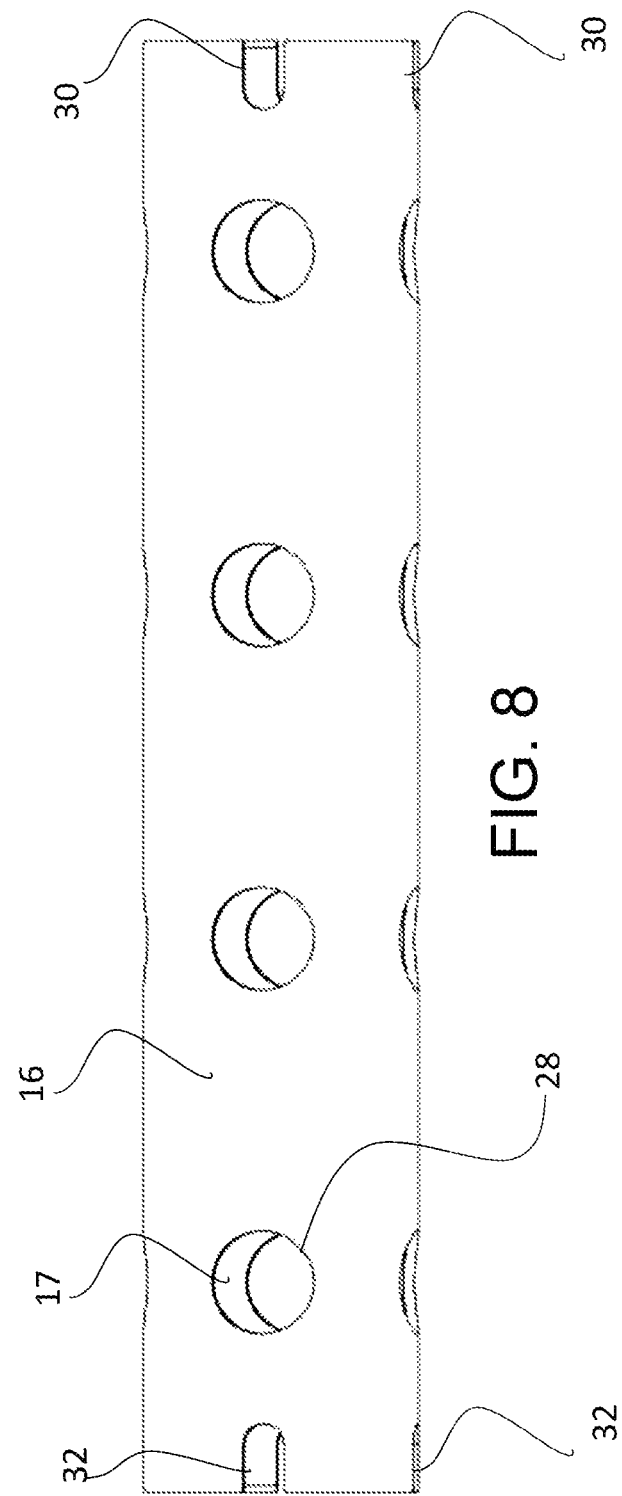
FIG. 8 shows a side view of the transmission tube of the motor cartridge.
Figure 9:
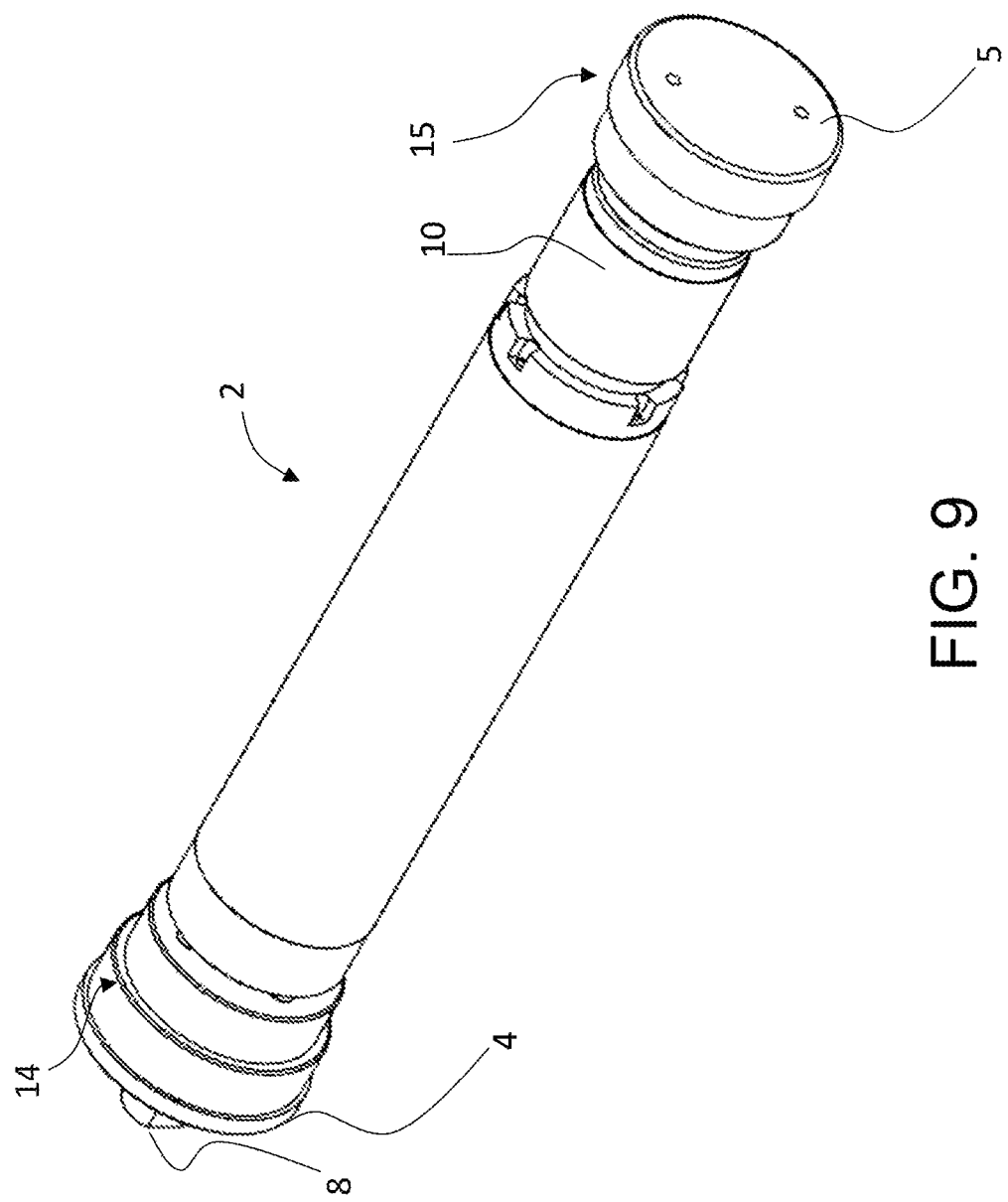
FIG. 9 shows an axonometric view of the motor cartridge of FIG. 5 without a transmission tube.
Figure 10:
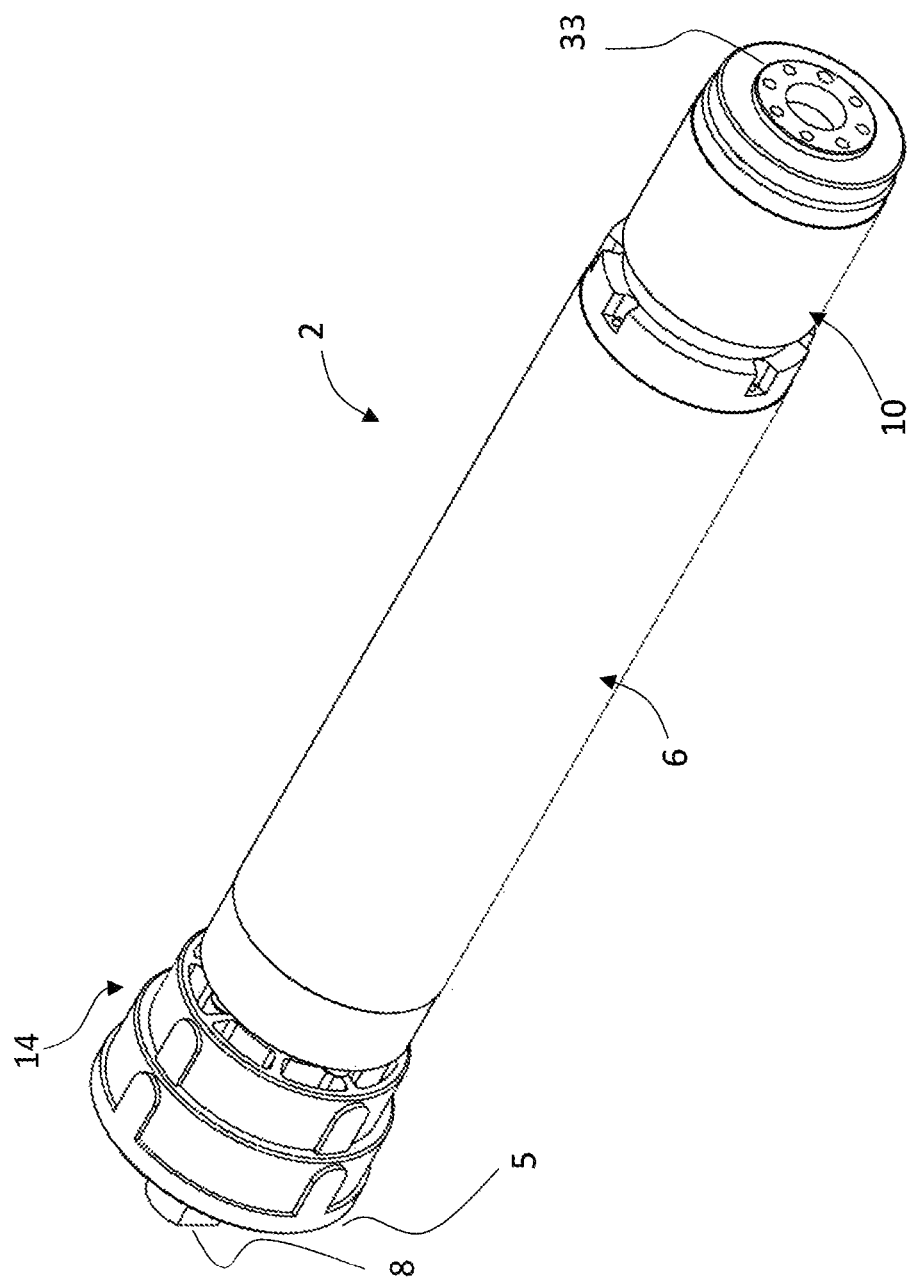
FIG. 10 shows an axonometric view of the cartridge of FIG. 9 without a sleeve.
Figure 11:
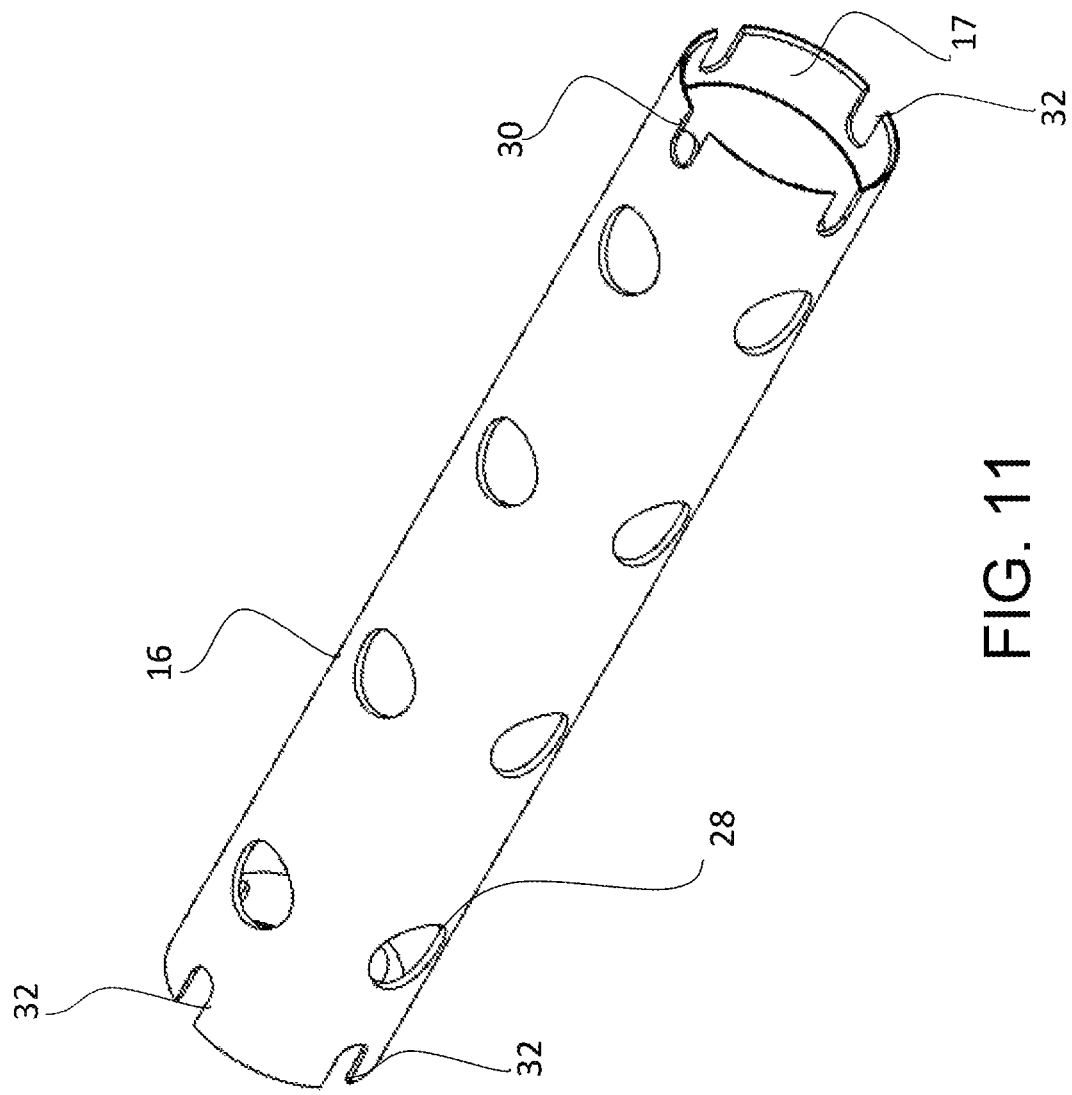
FIG. 11 shows an axonometric view of the transmission tube of FIG. 6.

According to a general embodiment, a motor cartridge for a roller is generally indicated by reference numeral 1.

Said motor cartridge 1 comprises a cartridge body 3 and a motor unit 2.

Said cartridge body 3 is elongated and extends along an axial direction A-A between a first cartridge body end 4 and a second cartridge body end 5.

Said motor unit 2 is exclusively supported at said first cartridge body end 4.

In accordance with an embodiment, said motor unit 2 is connected to said cartridge body 3 and its entire weight is exclusively supported at said first cartridge body end 4.

Advantageously, said motor cartridge 1 is adapted to be connected to a roller 100 exclusively by said first cartridge body end 4 leaving said cartridge body 3 in a cantilever manner.

Advantageously, said motor unit 2 is adapted to transmit a rotation torque to said roller 100 by shape coupling exclusively through said first cartridge body end 4.

Within this document, cartridge body 3 in a cantilever manner not only means that the cartridge body is firmly connected to the roller through said first cartridge body end 4 but also that other parts of the cartridge body, e.g. its cantilever portion, could indirectly or directly contact the roller 100. In any case, the motor cartridge 1 transmits the drive torque generated by the motor unit 2 to the roller 100 exclusively by said first cartridge end 4.

According to an embodiment, said motor cartridge 1 comprises a cartridge bearing 11. Said cartridge bearing 11 is arranged at least at said first cartridge body end 4 and said cartridge bearing 11 connects said motor unit 2 to said cartridge body 3 at said first cartridge body end 4.

According to an embodiment, said cartridge bearing 11 is the only bearing which connects said motor unit 2 to said cartridge body 3.

According to an embodiment, said cartridge body 3 comprises a head 14, wherein said head 14 is rotary and is arranged at said first cartridge body end 4.

According to an embodiment, said head 14 is adapted to be connected to said roller 100 by supporting said motor cartridge 1 in a cantilever manner. According to an embodiment, said head 14 is adapted to be connected to said roller 100 at least by geometric coupling or shape coupling. According to an embodiment said head 14 is adapted to be connected to said roller 100 by interference.

According to an embodiment, said motor unit 2 comprises a motor comprising a stator 6 and a rotor 7, wherein said rotor 7 is internal to said stator 6 or vice versa.

According to an embodiment, said cartridge bearing 11 is arranged between said stator 6 and said cartridge body 3 at said first cartridge body end 4.

According to an embodiment, said cartridge bearing 11 is arranged between said stator 6 and said head 14.

According to an embodiment, said head 14 comprises an axial head opening 22 in which said cartridge bearing 11 is accommodated.

According to an embodiment, said stator 6 comprises at least one portion arranged inside said axial head opening 22.

According to an embodiment, said rotor 7 is connected to said cartridge body 3 at least at said second cartridge end 5.

According to an embodiment, said stator 6 is supported by an internal bearing slewing ring 12 of said cartridge bearing 11. According to an embodiment, said stator 6 is fitted onto said internal bearing slewing ring 12.

According to an embodiment, said rotor 7 is supported, directly or indirectly, by an external bearing slewing ring 13 of the same cartridge bearing 11.

According to an embodiment, said stator 6 comprises a stationary shaft 8. According to an embodiment, said stationary shaft 8 is adapted to be connected to a structure of a roller conveyor so as to fasten said roller 100 to said roller conveyor. In other words, said stationary shaft 8, when said motor cartridge 1 is connected to said roller 100, forms the fastening shaft or stationary fastening portion of said roller 100. According to an embodiment, said cartridge bearing 11 is arranged between said stationary shaft 8 and said head 14. According to an embodiment, said stator 6 is supported by said internal bearing slewing ring 12 of said cartridge bearing 11 through said stationary shaft 8. According to an embodiment, said stationary shaft 8 is fitted onto said internal bearing slewing ring 12.

According to an embodiment, said stator 6 comprises a stator body 27 firmly connected to said stationary shaft 8. According to an embodiment, said stator body 27 comprises a stator base 35 adapted to axially close said stator body 27 in the direction of said first cartridge end 4. According to an embodiment, said stator body 27 is cup-shaped. According to an embodiment, said stator body has a closed cylindrical tubular shape on one side from said stator base 35. According to an embodiment, said stationary shaft 8 is connected to said stator base 35. According to an embodiment, said rotor 7 is arranged inside said stator body 27.

According to an embodiment, said motor comprises a pair of motor bearings arranged between said rotor 7 and said stator 6.

According to an embodiment, said motor unit 2 comprises a gear motor 10 connected to said rotor 7.

According to an embodiment, said rotor 7 comprises a rotor shaft coupled to said gear motor 10.

According to an embodiment, said gear motor 10 comprises a plurality of gears or toothed wheels accommodated in a reducer housing. According to an embodiment, said gear motor 10 is a planetary gear motor. According to an embodiment, said gear motor 10 comprises an end flange 33 which closes the reducer housing in the direction of said second cartridge end 5. According to an embodiment, said gear motor 10 comprises a gear motor shaft 9, or low speed shaft, connected by coupling to said end flange 33.

According to an embodiment, said gear motor 10 is connected to said cartridge body 3 at said second cartridge end 5.

According to an embodiment, said motor unit 2 comprises a brake. According to an embodiment, said brake is an electromagnetic brake. According to an embodiment, said motor unit 2 comprises an encoder or an electronic control and management unit configured to control said brake and said motor.

According to an embodiment, said cartridge body 3 comprises a transmission tube 16 which connects said second cartridge body end 5 and said first cartridge body end 4.

According to an embodiment, said motor unit 6 is housed inside said transmission tube 16.

According to an embodiment, said transmission tube 16 comprises a plurality of holes 28 for ventilating and cooling said motor unit 2. According to an embodiment, wherein said transmission tube 16 rotates integrally with said roller 100 with respect to said stationary shaft 8 which remains still, and thanks to the plurality of holes 28 a flow of air is formed for cooling the motor unit 2.

According to an embodiment, said transmission tube 16 is cylindrical and tubular.

According to an embodiment, said cartridge body 3 comprises a sleeve 15 at said second cartridge body end 5, wherein said sleeve 15 is opposite to said head 14, and wherein said motor unit 2 is directly connected to said sleeve 15.

According to an embodiment, said sleeve 15 comprises a coupling portion of sleeve 23 adapted to be coupled, in the axial direction A-A, to the end flange 33 of the gear motor 10 or to the gear motor shaft, or low speed shaft. According to an embodiment, the end flange 33 is axially connected to the coupling portion of sleeve 23 through connection means 34, preferably threaded connection means.

According to an embodiment, said transmission tube 16 is coupled at opposite ends at least by shape coupling to said head 14 and to said sleeve 15.

According to an embodiment, said head 14 and said sleeve are shaped like caps that are coupled to corresponding side openings of the cylindrical transmission tube 16.

According to an embodiment, said head 14 is fitted to said external bearing slewing ring 13.

According to an embodiment, said transmission tube 16 is fitted at opposite ends to said head 14 and to said sleeve 15.

According to an embodiment, said head 14, said transmission tube 16, said sleeve 15, said cartridge bearing 11, and said motor unit 2 are coaxial.

According to an embodiment, said head 14 comprises a first head portion 18 adapted for shape coupling to said roller 100.

According to an embodiment, said head 14 comprises a second head portion 19 adapted to be coupled by interference and/or gluing to said transmission tube 16.

According to an embodiment, said second head portion 19 is adapted to be coupled to an inner surface 17 of said transmission tube 16.

According to an embodiment, said head 14 comprises a plurality of first head teeth 29 adapted to be shape coupled to said transmission tube 16.

According to an embodiment, said transmission tube 16 comprises first transmission tube seats 30 counter-shaped with respect to said first head teeth 29.

According to an embodiment, said first head teeth 29 are inserted by shape coupling into said counter-shaped first transmission tube seats 30 so that said transmission tube 16 transmits said rotation torque from said motor unit 2 to said head 14.

According to an embodiment, said first head portion 18 comprises a plurality of second head teeth 36 adapted to be shape coupled to a roller body 101 of said roller 100. According to an embodiment, said roller body 101 at said first roller end 107, i.e. where said head 14 is coupled, comprises roller body seats 37 counter-shaped with respect to said second head teeth 36. According to an embodiment, said second head teeth 36 are inserted into said counter-shaped roller body seats 37, so that said motor cartridge 1 transmits said rotation torque from said motor unit 2 to said roller body 101 exclusively at said first roller end 107.

According to an embodiment, said head 14 comprises a third head portion 38 adapted to be coupled by interference and/or by gluing to an inner roller surface 109 of said roller body 101.

According to an embodiment, said sleeve 15 comprises a first portion of sleeve 20 configured to center said cartridge inside said roller 100 avoiding the transmission of any drive torque to said roller 100. According to an embodiment, said first sleeve portion 20 contacts or rests, directly or indirectly, inside said roller 100, avoiding the creation of a coupling adapted to transmit said rotation torque from said motor unit 2 to said roller 100 at said sleeve (15).

According to an embodiment, said sleeve 15 comprises a second sleeve portion 21 adapted to be coupled by interference and/or gluing to said transmission tube 16. According to an embodiment, said second sleeve portion 21 is coupled to a transmission tube inner surface 17 of said transmission tube 16.

According to an embodiment, said sleeve 15 comprises a plurality of sleeve teeth 31 adapted to be shape coupled to said transmission tube 16.

According to an embodiment, said transmission tube 16 comprises second transmission tube seats 32 counter-shaped with respect to said head teeth 29.

According to an embodiment, said sleeve teeth 31 are inserted into said counter-shaped second transmission tube seats 32 so that said sleeve 15 transmits said rotation torque from said motor unit 2 to said transmission tube 16.

According to an embodiment, said first transmission tube seats 30 and said second transmission tube seats 32 are made at diametrically opposite ends along the axial direction A-A of said transmission tube 16.

According to an embodiment, said axial direction A-A defines a radial direction R-R orthogonal to said axial direction A-A. According to an embodiment, said axial direction A-A defines a circumferential direction C-C orthogonal to said axial direction A-A and said radial direction R-R.

According to an embodiment, said first head teeth 29 and/or said second head teeth 36 and/or said sleeve teeth 31 each have a tooth body that projects in a radial direction R-R with respect to the head 14 or to the sleeve 15, wherein said tooth body extends mainly in the axial direction A-A.

According to an embodiment, said first transmission tube 30 and/or second transmission tube seats 32 and/or said roller body seats 37 form slots or discharges in the thickness of the transmission tube body 16 or in the roller body 101 having a prevalent extension in the axial direction A-A, wherein said slots or discharges are delimited in the circumferential direction C-C of the transmission tube body 16 or by the roller body 101 so that said rotation torque is transmitted by the respective head teeth 29, 36 or by the respective shape-coupled sleeve teeth 31.

According to an embodiment, said sleeve 15 comprises at least one annular sleeve seat 24 adapted to house a corresponding centering elastomer 25. Such centering elastomer 25 is shaped so as to prevent any transmission of said rotation torque from the motor cartridge 1 to the roller 100. According to an embodiment, said elastomer is an o-ring.

According to an embodiment, said sleeve 15 rests indirectly on an inner surface of said roller 100, said sleeve 15 being free to rotate inside said roller 100 avoiding transmitting said rotation torque to said roller 100.

According to an embodiment, said stationary shaft 8 is configured to be connected to a support frame or structure for said roller 100.

Within this document, coupling by interference and/or gluing means a coupling, between two components of the motor cartridge 1 or of the motor cartridge 1 and the roller 100, which prevents or limits any axial extraction along the direction A-A of one component with respect to another, which is unsuitable to transmit a rotation from one component to another.

The present invention further relates to a roller 100.

Said roller 100 comprises a roller body 101 and at least one motor cartridge 1 according to one of the embodiments previously described, in which said motor cartridge 1 is connected to said roller body 101 to place it in rotation.

According to an embodiment said roller body 101 extends between a first roller end 112 and a second roller end 113, wherein said roller body 101 defines a motor cartridge seat 106 therein.

According to an embodiment, said motor cartridge 1 is connected to said roller body 101 at said first roller end 107 through said first cartridge body end 4 leaving said cartridge body 3 projecting in a cantilever manner into said motor cartridge seat 106.

According to an embodiment, said motor cartridge 1 transmits a rotation torque to said roller 100 exclusively through said first cartridge body end 4.

According to an embodiment, said roller body 101 at said first roller end 107 is rotationally supported by said cartridge bearing 11.

According to an embodiment, said roller 100 comprises a transmission member 102 integrally connected to said roller body 101 at said second roller end 108, wherein said transmission member 102 is configured to transmit a rotary motion to a driven roller.

According to an embodiment, said transmission member 102 is a chain gear and/or a pulley, e.g. a belt pulley.

According to an embodiment, said cartridge body 3 is connected to said roller body 101 at said first roller end 107 at least by shape coupling.

According to an embodiment, said roller body 101 at said first roller end 107 comprises roller body seats 37 countershaped with respect to said second head teeth 36, so that as said second head teeth 36 are inserted into said countershaped roller body seats 37, said motor cartridge 1 transmits said rotation torque from said motor unit 2 to said roller body 101 exclusively at said first roller end 107.

According to an embodiment, said transmission member 102 comprises at least a first transmission element portion 104 adapted to be connected by interference to said roller body 101 or fastened by means of welding to said roller body 101.

According to an embodiment, said transmission member 102 comprises at least a second transmission member portion 105 adapted to be connected by geometric coupling to said roller body 101.

According to an embodiment, said transmission member 102 comprises an inner seat, in which a transmission member bearing 103 is accommodated.

According to an embodiment, said transmission member bearing 103 supports in rotation said roller 100 at said second roller end 108.

Advantageously, thanks to the provision of a first cartridge body end 4 adapted to support the motor unit 2 of the motor cartridge 1 and adapted to connect at least by shape coupling the motor cartridge 1 to a roller 100 so that the cartridge body 3 is overhanging with respect to the roller 100, it is possible to reduce the necessary components for the production of the motor cartridge 1 providing an extremely compact cartridge which is simple to replace in the event of any breakdown of the motor part.

Additionally, thanks to the provision of a motor unit 2 which is exclusively supported at said first end 4 and the provision of said first end 4 through which said motor cartridge 1 is adapted to be connected in a cantilever manner to said roller 100, it is possible to transfer the motor torque from the motor to the roller in the same point in which the motor is supported.

Additionally, the provision of a cartridge bearing 11 which supports in rotation both the motor cartridge 1 and the roller 100 at an end thereof, enables a roller 100 to be produced having a simpler construction than in the prior art, guaranteeing constantly efficient mechanical transmission.

LIST OF REFERENCES

1 Motor cartridge
2 motor unit
3 cartridge body
4 first or proximal cartridge body end
5 second or distal cartridge body end
6 stator
7 rotor
8 stationary shaft
9 reducer shaft
10 gear motor
11 cartridge bearing
12 internal bearing slewing ring
13 external bearing slewing ring
14 head
15 sleeve
16 transmission tube
17 inner transmission tube surface
18 first head portion
19 second head portion
20 first sleeve portion
21 second sleeve portion
22 axial head opening
23 sleeve coupling portion
24 sleeve annular seat
25 sleeve centering elastomer
26 motor housing seat
27 stator body
28 transmission tube holes
29 first head teeth
30 first transmission tube seats
31 sleeve teeth
32 second transmission tube seats
33 end flange
34 connection means
35 stator base
36 second head teeth
37 roller body seats
38 third head portion
100 motorized roller
101 roller body
102 transmission member
103 transmission member bearing
104 first portion of transmission member 105 second portion of transmission member
106 motor cartridge seat
107 first roller end
108 second roller end
109 inner roller surface
A-A axial direction

The invention claimed is:

1. A roller comprising:
a roller body that extends between a first roller end and a second roller end, wherein said roller body defines a motor cartridge seat therein,
a motor cartridge for the roller, comprising
a cartridge body, wherein said cartridge body is elongated and extends along an axial direction between a first cartridge body end and a second cartridge body end,
a motor unit, wherein said motor unit is supported at said first cartridge body end,
wherein said motor cartridge is connected to said roller body at said first roller end exclusively through said first cartridge body end leaving said cartridge body projecting in a cantilever manner into said motor cartridge seat, wherein said motor cartridge transmits a rotation torque to said roller by shape coupling exclusively through said first cartridge body end.

2. The roller of claim 1, further comprising a cartridge bearing, wherein one of the following features or a combination thereof is present:
said cartridge bearing is arranged at least at said first cartridge body end, said cartridge bearing connecting said motor unit to said cartridge body at said first cartridge body end,
said cartridge body comprises a head, wherein said head is rotary and arranged at said first cartridge body end.

3. The roller of claim 2, wherein said motor unit comprises a motor comprising a stator and a rotor, wherein said cartridge bearing is arranged between said stator and said cartridge body at said first cartridge body end, and wherein said rotor is connected to said cartridge body at least at said second cartridge body end.

4. The roller of claim 2, wherein said cartridge bearing is the only bearing that connects said motor unit to said cartridge body.

5. The roller of claim 3, wherein one or more of the following:
said stator is supported by an internal bearing slewing ring of said cartridge bearing, and said rotor is supported, directly or indirectly, at an external bearing slewing ring of said cartridge bearing,
said rotor is at least partially internal with respect to said stator or vice versa,
said motor unit comprises a gear motor connected to said rotor, wherein said gear motor is connected to said cartridge body at said second cartridge body end, and/or
said motor unit comprises a brake and an encoder or an electronic control and management unit configured to control said motor and/or said brake.

6. The roller of claim 5, wherein said brake is an electromagnetic brake.

7. The roller of claim 5, wherein one or more of the following:
said cartridge body comprises a transmission tube that connects said second cartridge body end and said first cartridge body end, wherein said motor unit is accommodated inside said transmission tube;
said cartridge body comprises a sleeve at said second cartridge body end, wherein said sleeve is opposite to said head, and wherein said motor unit is directly connected to said sleeve; and/or
said head is adapted to be connected to said roller by supporting said motor cartridge in a cantilever manner.

8. The roller of claim 7, wherein one or more of the following:
said transmission tube is fitted at least by shape coupling onto opposite ends of said head and onto said sleeve, wherein said head is fitted onto said external bearing slewing ring;
said transmission tube comprises a plurality of holes for ventilating and cooling said motor unit by rotating integrally with said head configured to transmit said rotation torque to said roller; and/or
said head, said transmission tube, said sleeve, said cartridge bearing, and said motor unit are coaxial.

9. The roller of claim 7, wherein one or more of the following:
said head comprises a first head portion adapted to be shape coupled to said roller and a second head portion adapted to be coupled by interference and/or by gluing to said transmission tube, at an inner surface of said transmission tube, and/or
said head comprises a plurality of first head teeth adapted to be shape coupled to said transmission tube, said plurality of first head teeth being inserted into first counter-shaped transmission tube seats so that said transmission tube transmits said rotation torque from said motor unit to said head.

10. The roller of claim 7, wherein said sleeve comprises a first sleeve portion configured to center said motor cartridge within said roller avoiding creating a coupling for transmitting said rotation torque from said motor unit to said roller at said sleeve, and wherein said sleeve comprises a second sleeve portion configured to be coupled by interference or by gluing to said transmission tube, to an inner transmission tube surface of said transmission tube, and wherein said sleeve comprises a plurality of sleeve teeth adapted to be shape coupled to said transmission tube, said sleeve teeth being inserted into second counter-shaped transmission tube seats so that said sleeve transmits said rotation torque from said motor unit to the transmission tube.

11. The roller of claim 7, wherein said sleeve comprises at least one annular sleeve seat adapted to accommodate a corresponding centering elastomer, wherein said sleeve rests indirectly on an inner surface of said roller, said sleeve being free to rotate within said roller preventing said rotation torque from being transmitted to said roller.

12. The roller of claim 7, wherein said sleeve comprises a sleeve coupling portion adapted to be axially coupled to an end flange of said gear motor or to a gear motor shaft of said gear motor, said end flange being connected to said sleeve coupling portion through connection means.

13. The roller of claim 12, wherein said connection means are threaded connection means.

14. The roller of claim 7, wherein said head comprises an axial head opening in which said cartridge bearing is accommodated.

15. The roller of claim 3, wherein said stator comprises a stationary shaft connected to a stator body, wherein said rotor is arranged within said stator body, and wherein said stationary shaft is adapted to be connected to a main structure of a roller conveyor to fix said roller to said roller conveyor.

16. The roller of claim 15, wherein said stator body is cup-shaped.

17. The roller of claim 15, wherein said stationary shaft is connected to a stator bottom of said stator body.

18. The roller of claim 1, wherein said motor cartridge comprises:
- a cartridge body, wherein said cartridge body is elongated and extends along an axial direction between a first cartridge body end and a second cartridge body end,
- a motor unit, wherein said motor unit is supported at said first cartridge body end,
- wherein said motor cartridge is connected to the roller exclusively by said first cartridge body end leaving said cartridge body projecting in a cantilever manner, and wherein said motor unit is adapted to transmit a rotation torque to said roller by shape coupling exclusively through said first cartridge body end.

19. The roller of claim 9, wherein one or more of the following:
- said roller body at said first roller end is rotationally supported by the cartridge bearing;
- said roller comprises a transmission member integrally connected to said roller body at said second roller end, wherein said transmission member is configured to transmit a rotary motion to a driven roller;
- said cartridge body is connected to said roller body at said first roller end at least by shape coupling,
- said first head portion comprises a plurality of second head teeth adapted to be shape coupled to said roller body,
- said roller body at said first roller end comprises roller body seats counter-shaped with respect to said second head teeth, said second head teeth being inserted into said counter-shaped roller body seats so that said motor cartridge transmits said rotation torque from said motor unit to said roller body exclusively at said first roller end, and/or
- said head comprises a third head portion adapted to be coupled by interference and/or by gluing to an inner roller surface of said roller body.

* * * * *